March 8, 1955 C. S. BAZZELL 2,703,658
VEHICLE CONVOY OR CARRIER WITH ADJUSTABLE RAMP
Filed Dec. 23, 1952 3 Sheets-Sheet 1
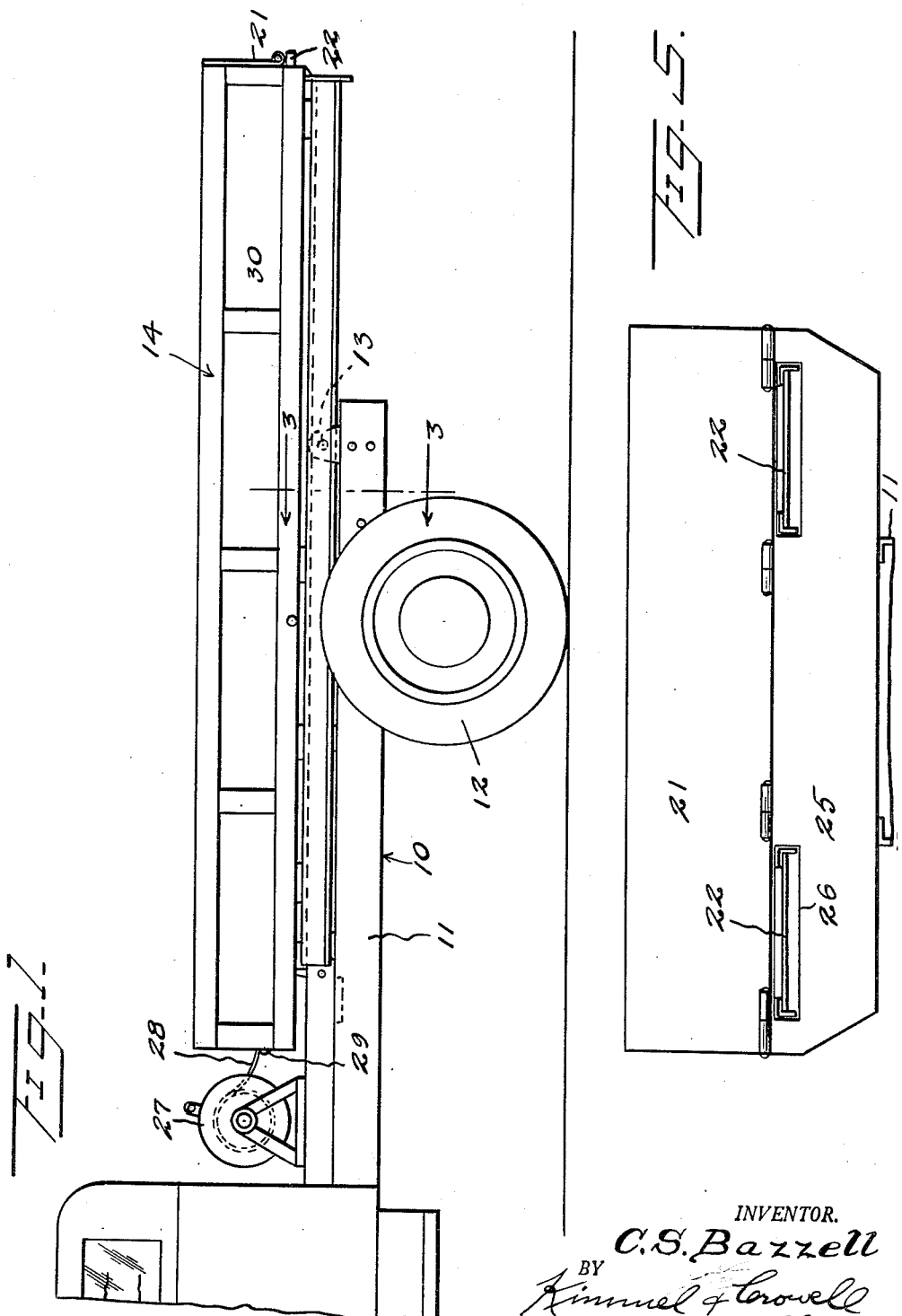
INVENTOR.
C. S. Bazzell
BY Kimmel & Crowell
Attys.

March 8, 1955     C. S. BAZZELL     2,703,658
VEHICLE CONVOY OR CARRIER WITH ADJUSTABLE RAMP
Filed Dec. 23, 1952     3 Sheets-Sheet 2
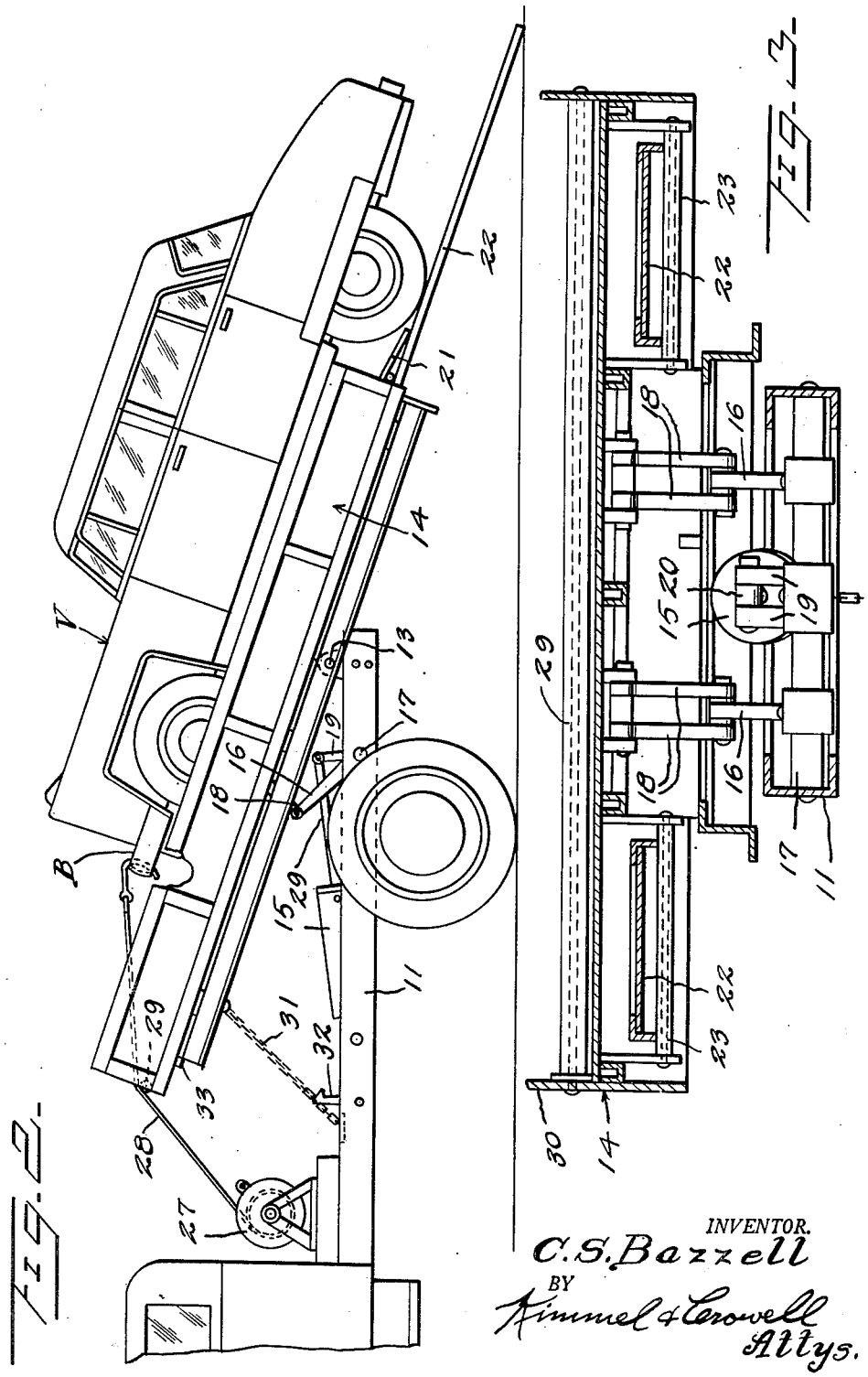
INVENTOR.
C. S. Bazzell
BY
Kimmel & Crowell
Attys.

March 8, 1955
C. S. BAZZELL
2,703,658
VEHICLE CONVOY OR CARRIER WITH ADJUSTABLE RAMP
Filed Dec. 23, 1952
3 Sheets-Sheet 3
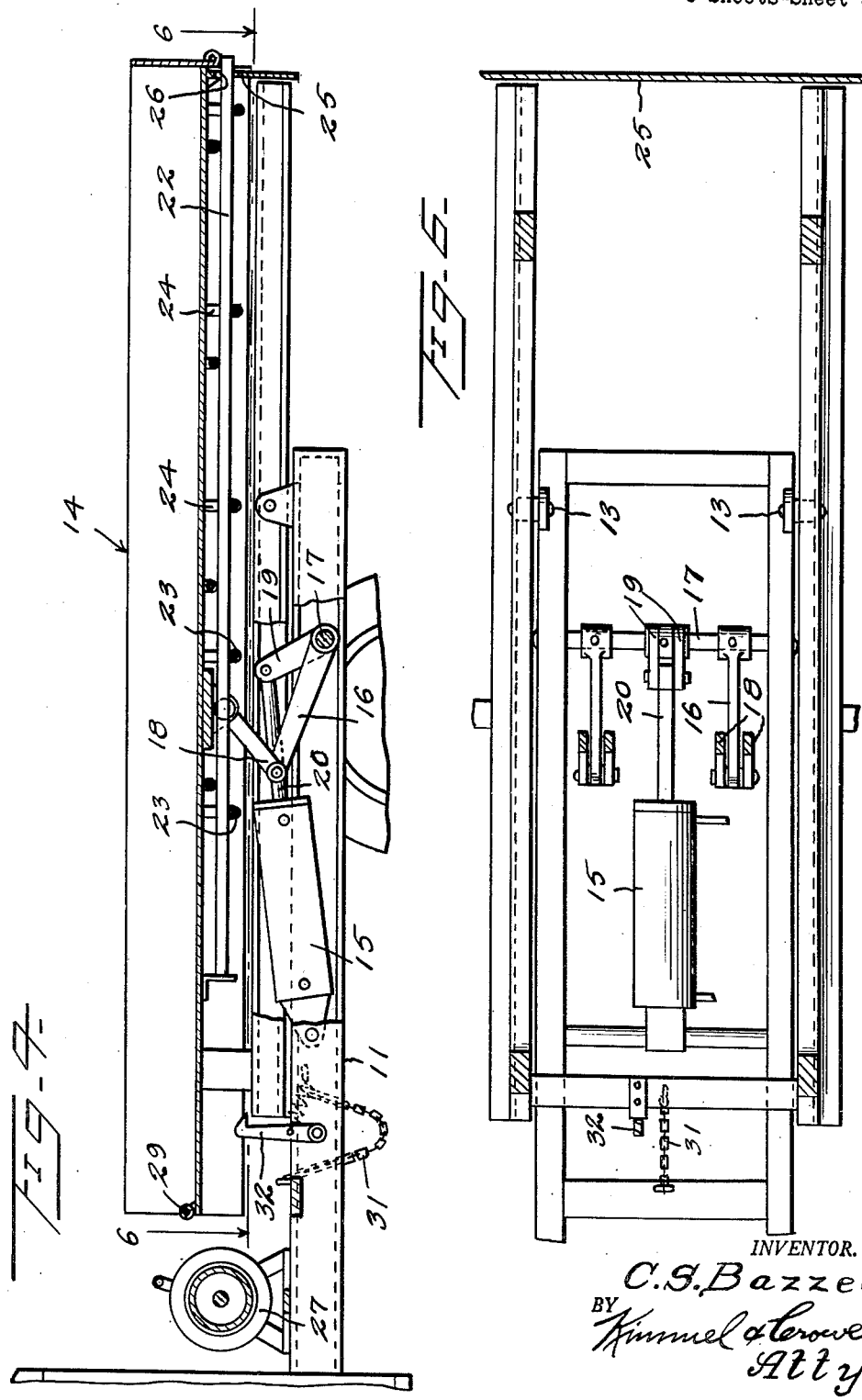
INVENTOR.
C. S. Bazzell
BY Kimmel & Crowell
Attys.

2,703,658

VEHICLE CONVOY OR CARRIER WITH ADJUSTABLE RAMP

Charly Syfrett Bazzell, Longview, Tex.

Application December 23, 1952, Serial No. 327,582

1 Claim. (Cl. 214—505)

This invention relates to a vehicle convoy or carrier.

When a vehicle is disabled or damaged, and particularly when the difficulty resides in an automatic transmission, the movement of the disabled vehicle by a tow car frequently causes undue damage to the transmission. It is, therefore, an object of this invention to provide means whereby a disabled vehicle may be bodily moved to a repair shop so that no additional damage will result to the transmission by reason of the transfer of the vehicle to the shop.

Another object of this invention is to provide a vehicle carrier means including a tilting vehicle body, extendible ramps, and means for pulling a vehicle up the ramps and into the body.

A further object of this invention is to provide in a vehicle having a tiltable body, extendible ramps supported beneath the body and adapted to be disposed in a position out of the way when contracted, so that the body may be used for carrying various articles or material when not used for carrying a disabled vehicle.

With the above and other objects in view, my invention consists in the arrangement, combination and details of construction disclosed in the drawings and specification, and then more particularly pointed out in the appended claim.

In the drawings—

Figure 1 is a fragmentary side elevation of a vehicle convoy or carrier constructed according to an embodiment of this invention, showing the body in horizontal inoperative position, Figure 2 is a fragmentary side elevation showing the body in vehicle receiving position, Figure 3 is a fragmentary sectional view taken on the line 3—3 of Figure 1, Figure 4 is a fragmentary longitudinal section showing the body in inoperative position, Figure 5 is a detailed end elevation of the vehicle body, Figure 6 is a fragmentary sectional view taken on the line 6—6 of Figure 4.

Referring to the drawings, the numeral 10 designates generally a mobile vehicle having a chassis 11 and rear wheels 12. The chassis 11 has rockably mounted thereon a body 14 which is pivoted as at 13 to the rear portion of the chassis 11. The body 14 is adapted to be tilted upwardly at its forward end by means of a hydraulic element 15 which is mounted within the chassis 11 and is connected to the body 14 by means of rock levers 16 which are carried by a horizontal shaft 17.

The levers 16 are connected with the body 14 by means of links 18 and an obliquely inclined lever 19 is fixed relative to the shaft 17 and is pivotally connected to the plunger rod 20 of the hydraulic member 15.

The body 14 includes a rear gate 21 hingedly secured to the rear of the body 14, and preferably the front end of the body 14 is open. A pair of extendible ramp members 22 are disposed in spaced parallel relation beneath the body 14 and when in collapsed or contracted position are adapted to be disposed entirely beneath the body 14, being supported on horizontally disposed rollers 23 which are carried by depending hangers 24 fixed relative to the body 14.

The body 14 is provided with a depending plate 25 at the rear thereof which is formed with a pair of openings 26 through which the ramps 22 are adapted to be drawn for positioning in extended operative position relative to the body 14. When it is desired to load a vehicle in the body 14, the vehicle is drawn upwardly into the body by means of a winch 27 which is carried by the chassis 11 forwardly of the body 14.

The cable 28 which is wound about the winch 27 is extended rearwardly over a roller 29 which is rotatably mounted between the sides 30 of the body 14. The cable 28 is connected at its rear or free end with the bumper B or other part of the disasbled vehicle V so that when the cable 28 is wound upon the drum of the winch 27, the disabled vehicle V will be pulled upwardly over the ramp 22 and the opened gate 21 into the body 14.

With a vehicle carrier or convoy as hereinbefore described, when the vehicle V becomes disabled as to its automatic transmission, the vehicle may be bodily picked up by the carrier. The body 14 is rocked upwardly at its forward end by operation of the hydraulic element 15 and the degree of tilting of the body 14 may be limited by means of a chain 31 which is connected between the body 14 and the chassis 11. After the vehicle V has been pulled upwardly into the body 14, the latter is swung downwardly to a horizontal position and is then latched in a horizontal position by means of one or more latching hooks 32 which are adapted to engage keepers 33 carried by the body 14.

As shown in Figures 1, 2, and 4, the position of the pivot 13 which connects the body 14 to the chassis 11 is rearwardly of the transverse median of the body 14 so that the weight of the vehicle V in the body 14 will not at any time tend to cause the body 14 to swing downwardly at its rear end. The greater portion of the body 14 being forwardly of the pivot 13 will cause the body 14 to normally swing downwardly and remain in the horizontal position irrespective of whether the body is locked or latched by the latching hook or hooks 32 or other securing means.

I do not mean to confine myself to the exact details of construction herein disclosed, but claim all variations falling with the purview of the appended claim.

What I claim is:

A vehicle convoy for loading and transporting a second vehicle, comprising a mobile chassis, a body, transverse shaft means beneath said body pivotally mounting said body at substantially the longitudinal mid-section thereof to said chassis at the rear end portion thereof, hydraulic means for raising the front end of said body to thereby incline the latter downwardly and rearwardly, said means including a cylinder, a piston movable thereby, an arm pivotally connected to said piston, a rotatable shaft carried by said body, means connecting said arm to said shaft, additional arms fixed to said shaft, links pivotally connected to said additional arms, a pivotal connection between said links and said body, a pair of ramp members, transverse roller means carried below each side of said body supporting said ramps longitudinally of said body for movement from a stored position beneath said body to an extended operative position projecting from the rear of said body when the latter is raised at the front thereof, an elongated transversely disposed roller carried by the front end of said body substantially at the level of the floor of said body, a transverse depending plate support secured to said body at its rear end, said plate having openings aligning with said transverse roller means on each side of said body permitting said ramps to be extended therethrough with the lower edges of the openings supporting the forward ends of said ramps in their fully extended position, a winch carried by said chassis forwardly of said body, a cable wound about said winch and engageable over said roller for pulling a vehicle upwardly over said ramps into said body, a tether chain connecting said body and said chassis adjacent the forward end of said body for limiting the upward pivotal movement of said body, and means latching said body in a horizontal carrying position.

References Cited in the file of this patent

UNITED STATES PATENTS 1,442,769    Jackson et al.             Jan. 16, 1923

(Other references on following page)

UNITED STATES PATENTS

| | | |
|---|---|---|
| 1,621,075 | Larkin | Mar. 15, 1927 |
| 1,858,797 | Wood et al. | May 17, 1932 |
| 2,082,663 | Slater | June 1, 1937 |
| 2,143,546 | Day | Jan. 10, 1939 |
| 2,588,001 | Holland | Mar. 4, 1952 |
| 2,613,827 | Van Doorne | Oct. 14, 1952 |
| 2,624,484 | Dalton | Jan. 6, 1953 |
| 2,630,929 | Pearson | Mar. 10, 1953 |

FOREIGN PATENTS

| | | |
|---|---|---|
| 440,233 | Great Britain | Dec. 23, 1935 |